US012794583B2

(12) United States Patent
Park et al.

(10) Patent No.: US 12,794,583 B2
(45) Date of Patent: Nov. 10, 2026

(54) QUANTUM ROUTER AND OPERATION METHOD THEREOF

(71) Applicant: Electronics and Telecommunications Research Institute, Daejeon (KR)

(72) Inventors: Jaegyu Park, Daejeon (KR); Young-Ho Ko, Daejeon (KR); Jin Tae Kim, Daejeon (KR); Kiwon Moon, Daejeon (KR); Jiho Park, Daejeon (KR); Jung Jin Ju, Daejeon (KR); Guhwan Kim, Daejeon (KR); Jinwoo Kim, Daejeon (KR); Hong-Seok Kim, Daejeon (KR); Tetiana Slusar, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 176 days.

(21) Appl. No.: 18/925,843

(22) Filed: Oct. 24, 2024

(65) Prior Publication Data

US 2026/0100777 A1 Apr. 9, 2026

(30) Foreign Application Priority Data

Oct. 30, 2023 (KR) ........................ 10-2023-0147084
Sep. 4, 2024 (KR) ........................ 10-2024-0120220

(51) Int. Cl.
*H04J 14/02* (2006.01)
*H04B 10/70* (2013.01)

(52) U.S. Cl.
CPC .......... *H04J 14/0267* (2013.01); *H04B 10/70* (2013.01); *H04J 14/0307* (2023.08)

(58) Field of Classification Search
None
See application file for complete search history.

(56) References Cited

U.S. PATENT DOCUMENTS 10,992,391 B1 * 4/2021 Meyers .............. H04B 10/0799
11,728,902 B1 8/2023 Meyers et al.

(Continued)

OTHER PUBLICATIONS

Behera, Bikash K., et al. "Designing quantum router in IBM quantum computer." Quantum Information Processing 18, 2019. (pp. 1-11).

(Continued)

*Primary Examiner* — David W Lambert
(74) *Attorney, Agent, or Firm* — NSIP Law

(57) ABSTRACT

Disclosed is a quantum router including a photon pair generation device that generates a deterministic entangled photon pair, a polarization adjustment device that converts and outputs a polarization state of the deterministic entangled photon pair, a multiplexing device that outputs first indistinguishable photons through first paths and outputs second indistinguishable photons through second paths, by performing double multiplexing on the output of the polarization adjustment device, and a control device that receives the second indistinguishable photons through the second paths. The first indistinguishable photons are transmitted to a plurality of nodes through the first paths. The control device is further configured to provide a quantum communication channel for two nodes among the plurality of nodes by performing bell-state measurement on two of the second indistinguishable photons.

17 Claims, 8 Drawing Sheets

(56) References Cited

U.S. PATENT DOCUMENTS

| | | | | |
|---|---|---|---|---|
| 2005/0025200 | A1 | 2/2005 | Santori et al. | |
| 2011/0073783 | A1 | 3/2011 | Arahira | |
| 2016/0352515 | A1 | 12/2016 | Bunandar et al. | |
| 2020/0244373 | A1 * | 7/2020 | Huberman ............. | H04B 10/70 |
| 2021/0105135 | A1 * | 4/2021 | Figueroa ................ | H04B 10/70 |
| 2021/0306077 | A1 | 9/2021 | Lim et al. | |
| 2022/0416907 | A1 * | 12/2022 | Hosseini ................ | H04B 10/70 |
| 2023/0161222 | A1 | 5/2023 | Ko et al. | |
| 2023/0370169 | A1 | 11/2023 | Chiesa et al. | |

OTHER PUBLICATIONS

Dai, Zijie, et al. "Compact Design for Bi-Polarization Quantum Routers on SOI Platform." Photonics. vol. 10. No. 8, p. 897, MDPI, Aug. 3, 2023. (pp. 1-12).

Gao, Huixia, et al. "Demonstration of a photonic router via quantum walks." New Journal of Physics 25.5, 053011, May 12, 2023. (pp. 1-10).

Lee, Yuan, et al. "A quantum router architecture for high-fidelity entanglement flows in quantum networks." npj Quantum Information 8.1, 75, 2022. (pp. 1-8).

Vajner, Daniel A., et al. "Quantum communication using semiconductor quantum dots." Advanced Quantum Technologies 5.7, 2100116, 2022. (pp. 1-40).

Korean Office Action Issued on Jun. 17, 2026, in Counterpart Korean Patent Application No. 10-2024-0120220 (10 Pages in English, 10 Pages in Korean).

* cited by examiner

QUANTUM ROUTER AND OPERATION METHOD THEREOF

CROSS-REFERENCE TO RELATED APPLICATIONS

This application claims priority under 35 U.S.C. § 119 to Korean Patent Application No. 10-2023-0147084 filed on Oct. 30, 2023 and No. 10-2024-0120220 filed on Sep. 4, 2024, in the Korean Intellectual Property Office, the disclosures of which are incorporated by reference herein in their entireties.

BACKGROUND

Embodiments of the present disclosure described herein relate to quantum communication, and more particularly, relate to a quantum router and an operating method thereof.

A quantum Internet or a quantum network refers to a configuration that distributes information and quantum resources among a plurality of nodes connected through quantum channels. The quantum Internet or quantum network may include a quantum processor configured to store qubits in the plurality of nodes and to perform a quantum operation, a quantum communication line configured to provide a quantum channel, a quantum router configured to form a communication path for transmitting a qubit to a target node among the plurality of nodes, a quantum repeater configured to transmit the qubit to a remote node, a quantum entangled device configured to prevent eavesdropping of quantum information, and an error correction code device configured to correct errors caused by instability of a quantum state.

For example, research results of cavity quantum routers, superconducting routers, and quantum dots routers have been recently reported with respect to quantum routers.

SUMMARY

Embodiments of the present disclosure provide a quantum router having improved performance and improved reliability and an operating method thereof.

According to an embodiment, a quantum router includes a photon pair generation device that generates a deterministic entangled photon pair, a polarization adjustment device that converts and outputs a polarization state of the deterministic entangled photon pair, a multiplexing device that outputs first indistinguishable photons through first paths and outputs second indistinguishable photons through second paths, by performing double multiplexing on the output of the polarization adjustment device, and a control device that receives the second indistinguishable photons through the second paths. The first indistinguishable photons are transmitted to a plurality of nodes through the first paths. The control device is further configured to provide a quantum communication channel for two nodes among the plurality of nodes by performing bell-state measurement on two of the second indistinguishable photons.

In an embodiment, the photon pair generation device includes a signal generator that outputs a periodic optical signal and a semiconductor quantum dot that generates the deterministic entangled photon pair in response to the periodic optical signal.

In an embodiment, the polarization adjustment device includes a λ wavelength plate that converts left circular polarization of the deterministic entangled photon pair to vertical polarization and converts right circular polarization of the deterministic entangled photon pair to horizontal polarization.

In an embodiment, an input and an output of the polarization adjustment device are connected through an optic fiber.

In an embodiment, the multiplexing device includes a wavelength division multiplexer that splits a photon of an exciton state and a photon of a bi-exciton state from the output of the polarization adjustment device, a first time-division multiplexer that sequentially outputs photons of the bi-exciton state as the first indistinguishable photons through the first paths, and a second time-division multiplexer that sequentially outputs photons of the exciton state as the second indistinguishable photons through the second paths.

In an embodiment, the multiplexing device is formed based on a photonic chip that is not polarization dependent.

In an embodiment, the wavelength division multiplexer is placed outside the photonic chip and connected to the photonic chip through an optic fiber.

In an embodiment, the first time-division multiplexer and the second time-division multiplexer are implemented based on a thermo-optic switch.

In an embodiment, the multiplexing device includes a plurality of time delay devices connected to the first paths and the second paths. The plurality of time delay devices are configured to respectively delay signals of the first paths and the second paths such that the first indistinguishable photons and the second indistinguishable photons are placed in parallel depending on a predetermined period.

In an embodiment, the control device includes a quantum memory that stores the second indistinguishable photons received through the second paths, and a bell-state measurement device that performs bell-state measurement on the two of the second indistinguishable photons stored in the quantum memory.

In an embodiment, the control device includes a switch array connected to the second paths and selecting two paths among the second paths, and a bell-state measurement device that receives the two of the second indistinguishable photons, which are stored in the quantum memory, through the two selected paths and performs bell-state measurement on the two second indistinguishable photons.

According to an embodiment, an operating method of a quantum router includes generating a deterministic entangled photon pair, converting circular polarization corresponding to the deterministic entangled photon pair into linear polarization, separating photons of an exciton state and photons of a bi-exciton state by performing wavelength division multiplexing on the deterministic entangled photon pair, transmitting the photons of the bi-exciton state to a plurality of nodes through first paths, respectively, and providing a quantum communication channel between two nodes among the plurality of nodes by performing bell-state measurement on two of the photons of the exciton state.

In an embodiment, the generating of the deterministic entangled photon pair includes generating a periodic optical signal, and generating the deterministic entangled photon pair through a semiconductor quantum dot in response to the periodic optical signal.

In an embodiment, the converting of the circular polarization corresponding to the deterministic entangled photon pair into the linear polarization includes converting left circular polarization corresponding to the deterministic entangled photon pair to vertical polarization, and converting right circular polarization to horizontal polarization.

In an embodiment, the separating of the photons of the exciton state and the photons of the bi-exciton state by performing the wavelength division multiplexing on the deterministic entangled photon pair includes adjusting a time delay for the first paths and second paths such that the photons of the exciton state output to the first paths and the photons of the bi-exciton state output to the second paths are arranged in parallel depending on a predetermined period.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure.

Figure 1:
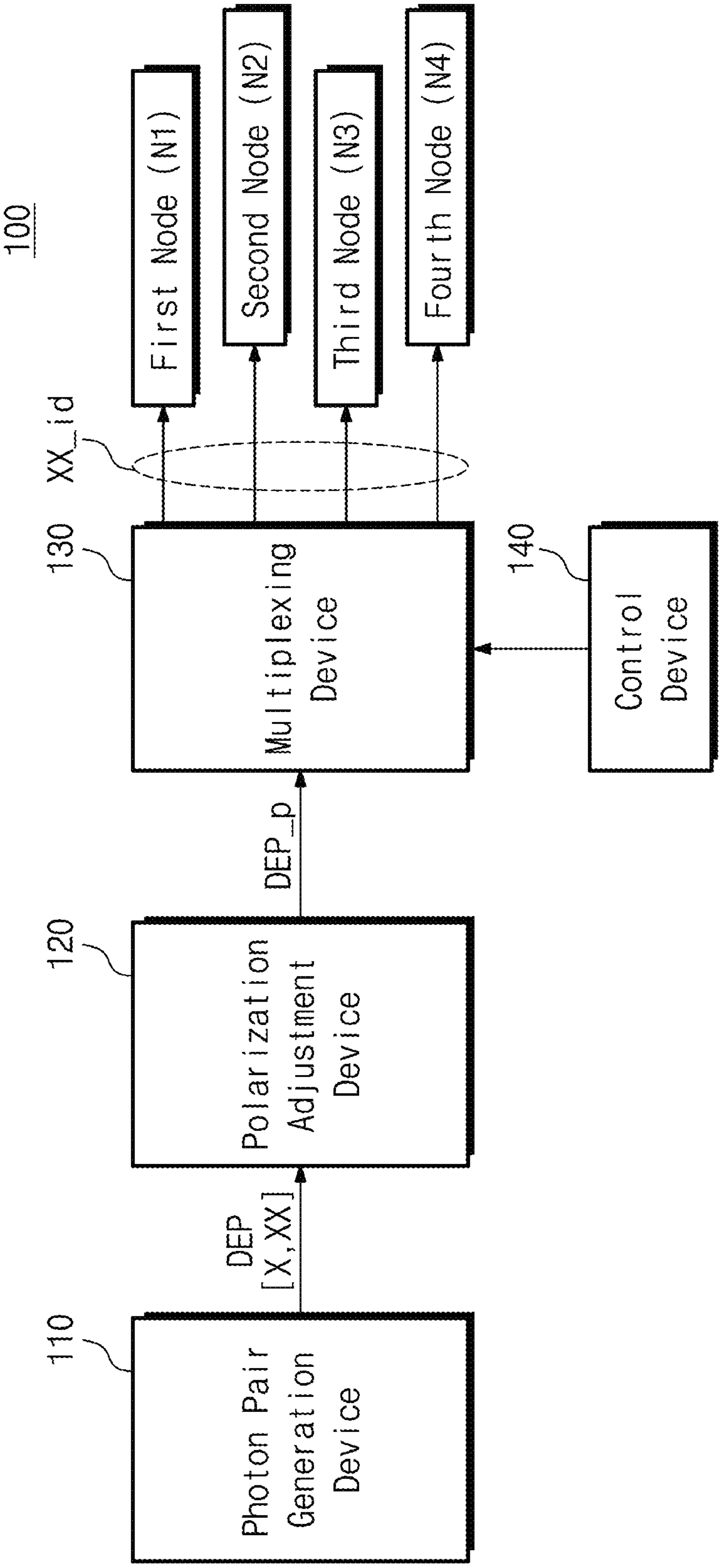
FIG. 1 is a block diagram showing a quantum router, according to an embodiment of the present disclosure.

FIG. 1 is a block diagram showing a quantum router, according to an embodiment of the present disclosure. Referring to FIG. 1, a quantum router 100 may include a photon pair generation device 110, a polarization adjustment device 120, a multiplexing device 130, and a control device 140. In an embodiment, the quantum router 100 may be configured to provide or control a quantum communication path between a plurality of nodes in a quantum Internet or a quantum network.

The photon pair generation device 110 may generate a deterministic entangled photon pair DEP. For example, the deterministic entangled photon pair DEP may include a photon pair generated from a semiconductor quantum dot, and each of photons of the photon pair may have an exciton X state and a bi-exciton XX state. Photons in the exciton X state and the bi-exciton XX state may have quantum entanglement in a polarization state.

The polarization adjustment device 120 may be configured to control, adjust, or convert the polarization state of the deterministic entangled photon pair DEP. For example, as described above, the quantum entanglement may be present in polarization states of the photons of the deterministic entangled photon pair DEP. For example, when the exciton X state corresponds to right circular polarization, the bi-exciton XX state may correspond to left circular polarization. In contrast, when the exciton X state corresponds to left circular polarization, the bi-exciton XX state may correspond to right circular polarization.

The polarization adjustment device 120 may convert a circular polarization state of the deterministic entangled photon pair into a linear polarization state. For example, the polarization adjustment device 120 may convert right circular polarization to horizontal polarization, and may convert left circular polarization to vertical polarization. In other words, states of photons of the deterministic entangled photon pair DEP may be converted into states of horizontal polarization and vertical polarization, respectively. Hereinafter, for convenience of description, the output (i.e., a polarization-converted deterministic entangled photon pair) of the polarization adjustment device 120 is referred to as a polarization-converted photon pair DEP_p. These terms are merely intended to facilitate the description of operations of components according to an embodiment of the present disclosure.

The multiplexing device 130 performs double multiplexing on the polarization-converted photon pair DEP_p, thereby splitting photon pairs having an entangled state. For example, the exciton state X and the bi-exciton state XX of the photons of the polarization-converted photon pair DEP_p have different energies, and thus may be separated from each other through wavelength multiplexing. That is, the multiplexing device 130 may separate a photon of the exciton state X and a photon of the bi-exciton state XX from the polarization-converted photon pair DEP_p through wavelength multiplexing.

The multiplexing device 130 may sequentially output the photon of the exciton state X and the photon of the bi-exciton state XX by performing time-division multiplexing on the photon of the exciton state X and the photon of the bi-exciton state XX. In an embodiment, each of the time-divided photons of the exciton state and the time-divided photons of the bi-exciton state may be in indistinguishable states. For convenience of description, excitons of photons output from the multiplexing device 130 are referred to as an "indistinguishable exciton state X_id" and an "indistinguishable bi-exciton state XX_id".

The photons of indistinguishable bi-exciton state XX_id output from the multiplexing device 130 may be provided to the plurality of nodes N1, N2, N3, and N4, respectively. In an embodiment, each of the plurality of nodes N1, N2, N3, and N4 may include a quantum processor configured to store a qubit and to perform a quantum operation. The photons of the indistinguishable exciton state X_id output from the multiplexing device 130 may be provided to the control device 140.

The control device 140 may provide a quantum communication path between the plurality of nodes N1, N2, N3, and N4 through bell-state measurement (BSM) for photons of the indistinguishable exciton state X_id received from the multiplexing device 130. For example, the photons of the indistinguishable exciton state X_id and the photons of the indistinguishable bi-exciton state XX_id may each maintain quantum entanglement. In this case, when providing a quantum communication path between the first node N1 and the third node N3, the control device 140 may perform bell-state measurement (BSM) on photons of the indistinguishable exciton state X_id corresponding to photons of the indistinguishable bi-exciton state XX_id respectively provided to the first and third nodes N1 and N3. Accordingly, as entangled photon pairs are distributed to the first and third nodes N1 and N3, the quantum communication path between the first and third nodes N1 and N3 may be provided.

As described above, according to the embodiment of the present disclosure, the quantum router 100 may distribute a deterministic entangled photon pair to the plurality of nodes N1 to N4, and thus the quantum communication path between the plurality of nodes N1 to N4 may be freely generated or provided. The configuration and operation of the quantum router 100 according to an embodiment of the present disclosure are described in more detail with reference to drawings below.

Figure 2:
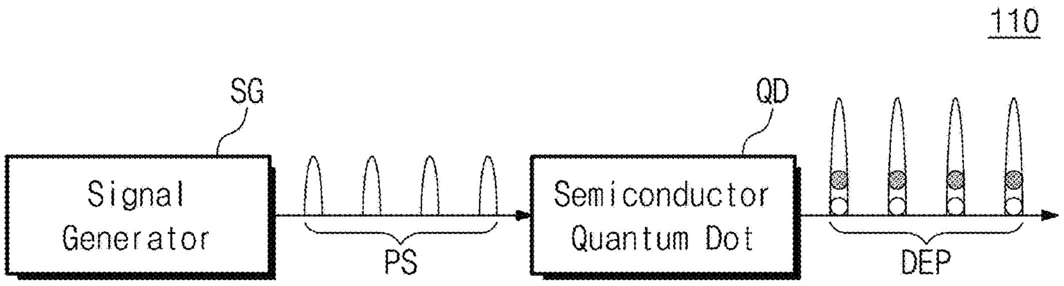
FIG. 2 is a block diagram showing a photon pair generation device of FIG. 1.

FIG. 2 is a block diagram showing a photon pair generation device of FIG. 1. Referring to FIGS. 1 and 2, the photon pair generation device 110 may include a signal generator SG and a semiconductor quantum dot QD. The signal generator SG may generate a periodic optical signal PS. For example, the signal generator SG may generate the optical signal PS that is generated depending on a predetermined period or a predetermined frequency. In an embodiment, the optical signal PS generated by the signal generator SG may be replaced with an electrical signal.

The optical signal PS generated by the signal generator SG may be input to the semiconductor quantum dot QD. In this case, two electron-hole pairs may be created within the semiconductor quantum dot QD. In an embodiment, according to the structure of the semiconductor quantum dot QD, two electron-hole pairs may be converted into light in tens of ps to tens of ns. Accordingly, the deterministic entangled photon pair DEP having the same period as the optical signal PS may be generated from the semiconductor quantum dot QD. The photons of the deterministic entangled photon pair DEP may correspond to the exciton state X and the bi-exciton state XX, respectively. Quantum entanglement is present in the polarization state of the exciton state X and the bi-exciton state XX.

In an embodiment, to improve the quality of the deterministic entangled photon pair DEP, the semiconductor quantum dot QD may be cooled to a liquid helium temperature, and the signal generator SG inputs a laser having the same energy state as the energy state of the semiconductor quantum dot QD as the optical signal PS to the semiconductor quantum dot QD such that an electron-hole pair may be generated. The deterministic entangled photon pair DEP generated by the semiconductor quantum dot QD may be highly efficiently focused onto an optical fiber.

As described above, the photon pair generation device 110 may be based on a quantum light source configured to generate the deterministic entangled photon pair DEP, but the scope of the present disclosure is not limited thereto.

Figures 3A, 3B:
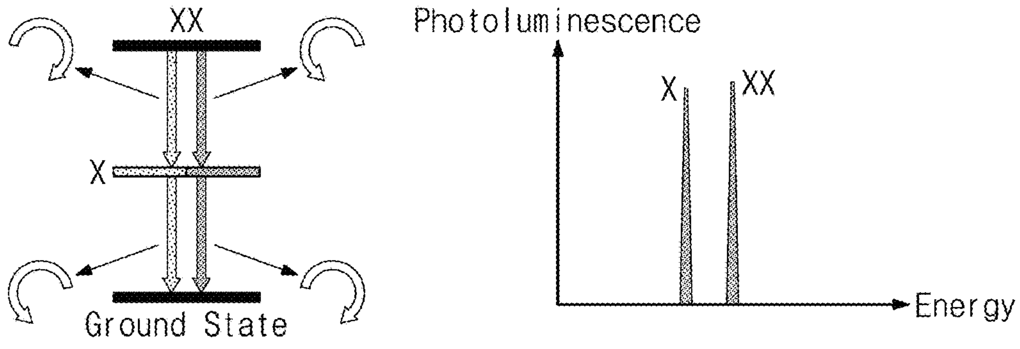
FIGS. 3A and 3B are drawings for describing a deterministic entangled photon pair.

FIGS. 3A and 3B are drawings for describing a deterministic entangled photon pair. First of all, FIG. 3A is a schematic diagram showing the radioactive decay of the exciton state X and the bi-exciton state XX in the semiconductor quantum dot QD. FIG. 3B shows energy states of the exciton state X and the bi-exciton state XX. As shown in FIGS. 3A and 3B, when the exciton state X and the bi-exciton state XX have different energy states from each other, and are excited to the ground state, the exciton state X and the bi-exciton state XX may correspond to a left circular polarization state or a right circular polarization state, respectively. Accordingly, the exciton state X and the bi-exciton state XX have entangled states.

In other words, the deterministic entangled photon pair DEP generated by the photon pair generation device 110 has a quantum entangled state in a polarization state. The quantum entangled state of the deterministic entangled photon pair DEP may be expressed based on Equation 1.

$$\overline{|R_X L_{XX} + L_X R_{XX})} \quad \text{[Equation 1]}$$

Referring to Equation 1, Rx may denote a right circular polarization R of the exciton state X; $L_{xx}$ may denote a left circular polarization L of the bi-exciton state XX; $L_x$ may denote the left circular polarization L of the exciton state X; and, $R_{xx}$ may denote the right circular polarization R of the bi-exciton state XX. As described in Equation 1, when the exciton state X is the left circular polarization L, the bi-exciton state XX may be the right circular polarization state R. When the exciton state X is the right circular polarization R, the bi-exciton state XX may be the left circular polarization state L. In other words, the deterministic entangled photon pair DEP generated by the photon pair generation device 110 has a quantum entangled state in a polarization state.

Figure 4:
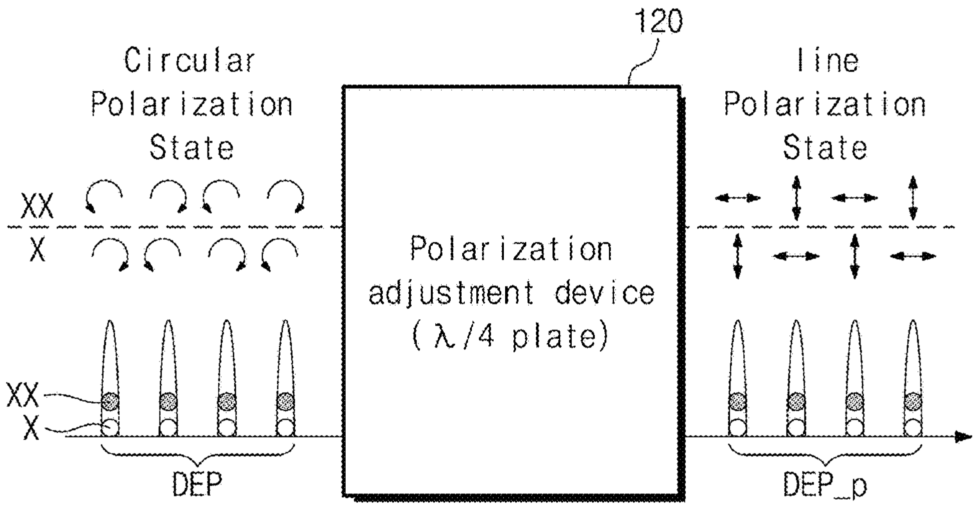
FIG. 4 is a drawing showing the polarization adjustment device of FIG. 1.

FIG. 4 is a drawing showing the polarization adjustment device of FIG. 1. Referring to FIGS. 1 and 4, the polarization adjustment device 120 may be configured to convert the polarization state of the deterministic entangled photon pair DEP.

For example, the deterministic entangled photon pair DEP generated from the photon pair generation device 110 may have an entangled state in the polarization state. In this case, the polarization state may be left circular polarization or right circular polarization. The polarization adjustment device 120 may convert a circular polarization state of the deterministic entangled photon pair DEP into a linear polarization state by using a λ/4 wavelength plate. In an embodiment, the polarization adjustment device 120 may convert left circular polarization to vertical polarization and may convert right circular polarization to horizontal polarization. Hereinafter, a photon pair whose polarization state is converted by the polarization adjustment device 120 may be referred to as the "polarization-converted photon pair DEP_p".

In an embodiment, the deterministic entangled photon pair DEP generated from the photon pair generation device 110 may be provided to the polarization adjustment device 120 through an optic fiber, and the polarization-converted photon pair DEP_p generated by the polarization adjustment device 120 may be output through an optic fiber.

Figure 5:
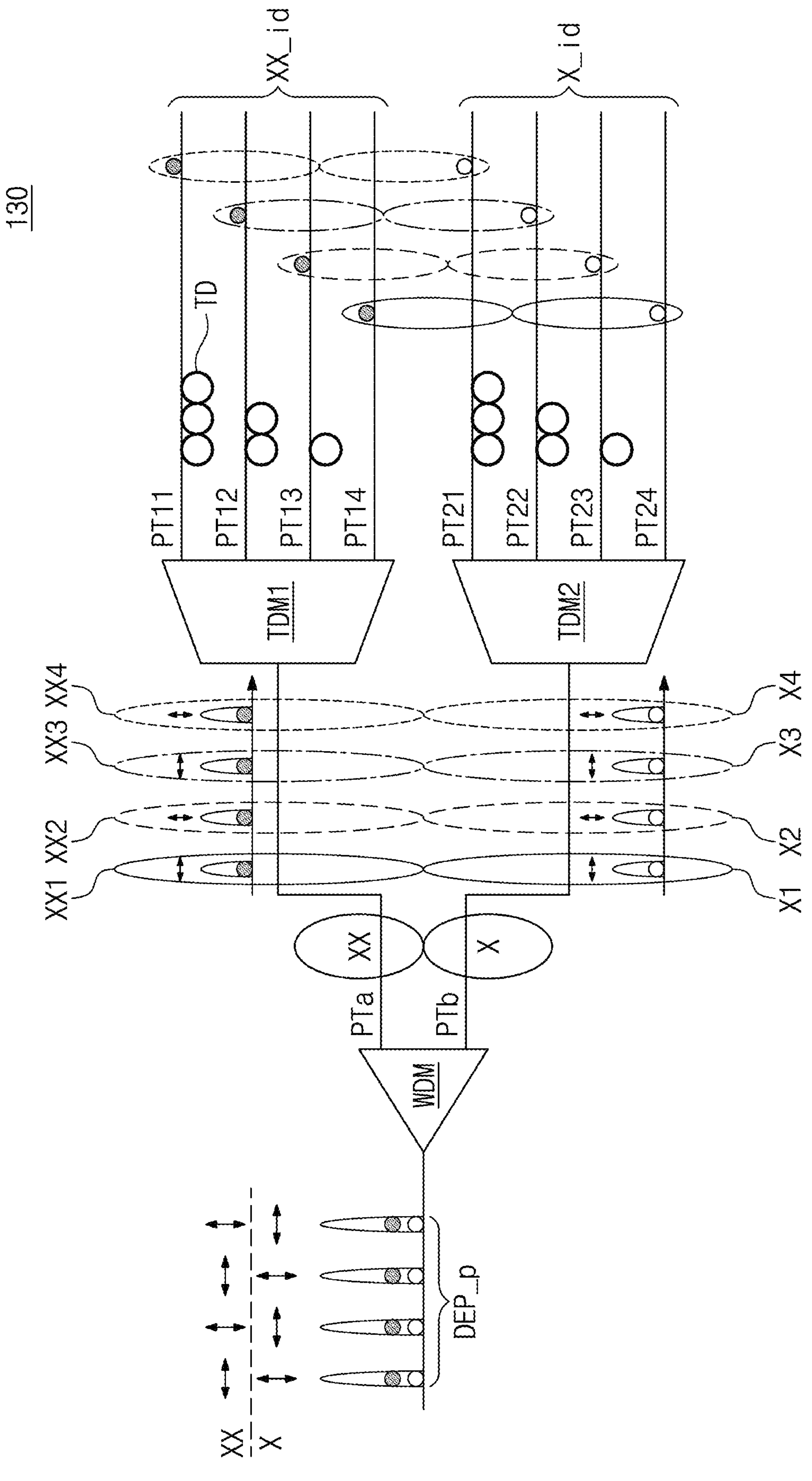
FIG. 5 is a drawing showing the multiplexing device of FIG. 1.

FIG. 5 is a drawing showing the multiplexing device of FIG. 1. Referring to FIGS. 1 and 5, the multiplexing device 130 may receive the polarization-converted photon pair DEP_p from the polarization adjustment device 120. The multiplexing device 130 may perform a multiplexing operation on the polarization-converted photon pair DEP_p. The multiplexing device 130 may include a wavelength division multiplexer WDM, a first time-division multiplexer TDM1, and a second time-division multiplexer TDM2.

The wavelength division multiplexer WDM may be configured to separate the photon of the exciton state X and the photon of the bi-exciton state XX from the polarization-converted photon pair DEP_p. Hereinafter, for convenience of description, the photon of the exciton state is referred to as an "X-photon", and the photon of the bi-exciton state is referred to as an "XX-photon". For example, as described with reference to FIG. 3B, the X-photon X and the XX-photon XX, which are the deterministic entangled photon pair DEP generated from the semiconductor quantum dot QD, have different energies from each other. In this case, the X-photon X and the XX-photon XX may be separated from each other through different paths PTa and PTb by the wavelength division multiplexer WDM. In an embodiment, even when the X-photon X and the XX-photon XX are separated from each other through different paths, the corresponding photons may maintain an entangled state.

For example, even though a path is separated by the wavelength division multiplexer WDM when a first X-photon X1 and a first XX-photon XX1 included in a first photon pair have entangled states, the first X-photon X1 on the a-th path PTa and the first XX-photon XX1 on the b-th path PTb maintain an entangled state with each other. Even though a path is separated by the wavelength division multiplexer WDM when a second X-photon X2 and a second XX-photon XX2 included in a second photon pair have entangled states, the second X-photon X2 on the a-th path PTa and the second XX-photon XX2 on the b-th path PTb maintain an entangled state with each other. Even though a path is separated by the wavelength division multiplexer WDM when a third X-photon X3 and a third XX-photon XX3 included in a third photon pair have entangled states, the third X-photon X3 on the a-th path PTa and the third XX-photon XX3 on the b-th path PTb maintain an entangled state with each other. Even though a path is separated by the wavelength division multiplexer WDM when a fourth X-photon X4 and a fourth XX-photon XX4 included in a fourth photon pair have entangled states, the fourth X-photon X4 on the a-th path PTa and the fourth XX-photon XX4 on the b-th path PTb maintain an entangled state with each other.

The first time-division multiplexer TDM1 may sequentially distribute the XX-photons XX1 to XX4 of the a-th path PTa separated by the wavelength division multiplexer WDM to different paths PT11 to PT14. The second time-division multiplexer TDM2 may sequentially distribute the X-photons X1 to X4 of the b-th path PTb separated by the wavelength division multiplexer WDM to different paths PT21 to PT24.

In an embodiment, the paths PT11 to PT14 output from the first time-division multiplexer TDM1 and the paths PT21 to PT24 output from the second time-division multiplexer TDM2 may include a time delay device TD. The time delay device TD may control the delay of a signal output to each path. For example, the XX-photons XX1 to XX4 sequentially output from the first time-division multiplexer TDM1 and the X-photons X1 to X4 sequentially output from the second time-division multiplexer TDM2 may have a time difference from each other. To maintain the quantum entanglement relationship between the XX-photons XX1 to XX4 and the X-photons X1 to X4, it is necessary to compensate for the time difference between the XX-photons XX1 to XX4 and the X-photons X1 to X4. The time delay device TD may compensate for the time difference of each path and then may distribute the corresponding XX-photons XX1 to XX4 and the X-photons X1 to X4 in parallel depending on a specific time or a predetermined cycle. In this case, the corresponding photons may maintain a quantum entangled state with each other.

For example, by the time delay device TD, the first XX-photon XX1 of the eleventh path PT11 and the first X-photon X1 of the 21st path PT21 may be distributed in parallel at the same time; the second XX-photon XX2 of the twelfth path PT12 and the second X-photon X2 of the 22nd path PT22 may be distributed in parallel at the same time; the third XX-photon XX3 of the thirteenth path PT13 and the third X-photon X3 of the 23rd path PT23 may be distributed in parallel at the same time; and, the fourth XX-photon XX4 of the fourteenth path PT14 and the fourth X-photon X4 of the 24th path PT24 may be distributed in parallel at the same time. Accordingly, the XX-photons XX1 to XX4 and the X-photons X1 to X4 may maintain quantum entangled states with each other.

For brevity of drawing, a structure in which one XX-photon or one X-photon is transmitted through each path is shown, but the scope of the present disclosure is not limited thereto. For example, XX-photons and X-photons may be continuously transmitted through the plurality of paths PT11 to PT14 and PT21 to PT24. In this case, the time delay of the plurality of paths PT11 to PT14 and PT21 to PT24 may be controlled by the time delay device TD. Accordingly, the XX-photons and X-photons of the plurality of paths PT11 to PT14 and PT21 to PT24 may be arranged in parallel at a specific time. Accordingly, the XX-photons XX on the eleventh path PT11 and the X-photons X on the 21st path PT21 may maintain a quantum entangled state; the XX-photons XX on the twelfth path PT12 and the X-photons X on the 22nd path PT22 may maintain a quantum entangled state; the XX-photons XX on the thirteenth path PT13 and the X-photons X on the 23rd path PT23 may maintain a quantum entangled state; and, the XX-photons XX on the fourteenth path PT14 and the X-photons X on the 24th path PT24 may maintain a quantum entangled state.

In an embodiment, the XX-photons XX on the eleventh to fourteenth paths PT11 to PT14 are in mutually indistinguishable states, and the X-photons X on the 21 st to 24th paths PT21 to PT24 are in mutually indistinguishable states. As described above, the multiplexing device 130 may perform double multiplexing on the deterministic entangled photon pair DEP (or the polarization-converted photon pair DEP_p). In this case, the photon pair, in which entangled states are indistinguishable from each other and which has entangled states, is always present at a fixed time or a specific time.

In an embodiment, the configuration of the photon pair generation device 110, the polarization adjustment device 120, and the multiplexing device 130 described with reference to FIGS. 1 to 5 are some examples, and the scope of the present disclosure is not limited thereto. In an embodiment, the photon pair generation device 110 may be located within a cryogenic system and cooled to a liquid helium temperature. The deterministic entangled photon pair DEP generated by the photon pair generation device 110 (or the semiconductor quantum dot QD) inside the cryogenic system may move to a place at the room temperature in an atmospheric pressure environment through an optic fiber. Afterwards, the polarization of the deterministic entangled photon pair DEP may be adjusted by the polarization adjustment device 120 packaged with a low-loss optic fiber. Afterwards, the deterministic entangled photon pair DEP may be double-multiplexed by the multiplexing device 130 and then may be split into photons of the exciton state and the bi-exciton state through different paths.

In an embodiment, the multiplexing device 130 may be fabricated as a photonic chip. In an embodiment, the wavelength division multiplexer WDM included in the multiplexing device 130 may be integrated into a photonic chip. Alternatively, the wavelength division multiplexer WDM included in the multiplexing device 130 may be implemented as a separate device (i.e., a form separate from the photonic chip) connected to an optical fiber. In an embodiment, the photonic chip may be designed to be polarization-independent. To this end, the first and second time-division multiplexers TDM1 and TDM2 included in the multiplexing device 130 WDM may use a thermo-optic switch.

Figure 6:
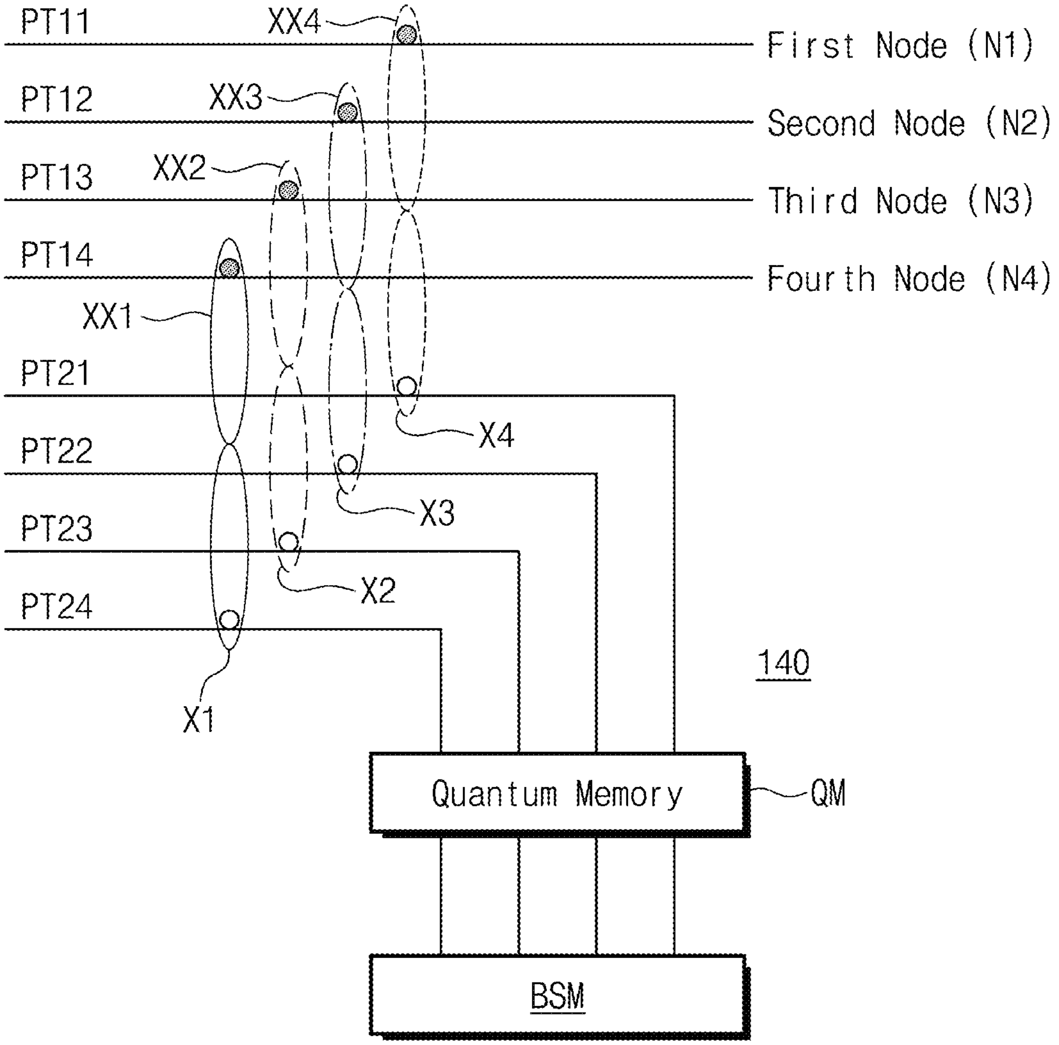
FIG. 6 is a drawing showing the control device of FIG. 1.

FIG. 6 is a drawing showing the control device of FIG. 1. Referring to FIGS. 1, 5, and 6, the control device 140 may include a quantum memory QM and a bell-state measurement device BSM.

The first to fourth XX-photons XX1 to XX4 output from the multiplexing device 130 may be provided to the first to fourth nodes N1 to N4 through the eleventh to fourteenth transmission paths PT11 to PT14, respectively.

The first to fourth X-photons X1 to X4 output from the multiplexing device 130 may be provided to the quantum memory QM through the 21st to 24th transmission paths PT21 to PT24, respectively. The quantum memory QM may be configured to store the first to fourth X-photons X1 to X4 received through the 21st to 24th transmission paths PT21 to PT24.

The bell-state measurement device BSM may provide a quantum communication channel between the first to fourth nodes N1 to N4 by performing bell-state measurement on some of the X-photons stored in the quantum memory QM. For example, it is assumed that a quantum communication channel is provided between the first and third nodes N1 and N3. In this case, the first node N1 receives the first XX-photon XX1 through the eleventh path PT11, and the third node N3 receives the third XX-photon XX3 through the thirteenth path PT13. The bell-state measurement device BSM may perform bell-state measurement on the first X-photon X1 having an entangled state with the first XX-photon XX1 and the third X-photon X3 having an entangled state with the third XX-photon XX3. In this case, an entangled photon pair may be distributed to the first node N1 and the third node N3, and thus a quantum communication channel between the first node N1 and the third node N3 may be provided.

As described above, the control device 140 may provide a quantum communication channel between arbitrary nodes, by performing bell-state measurement on X-photons corresponding to arbitrary nodes to which a quantum communication channel is provided.

Figure 7:
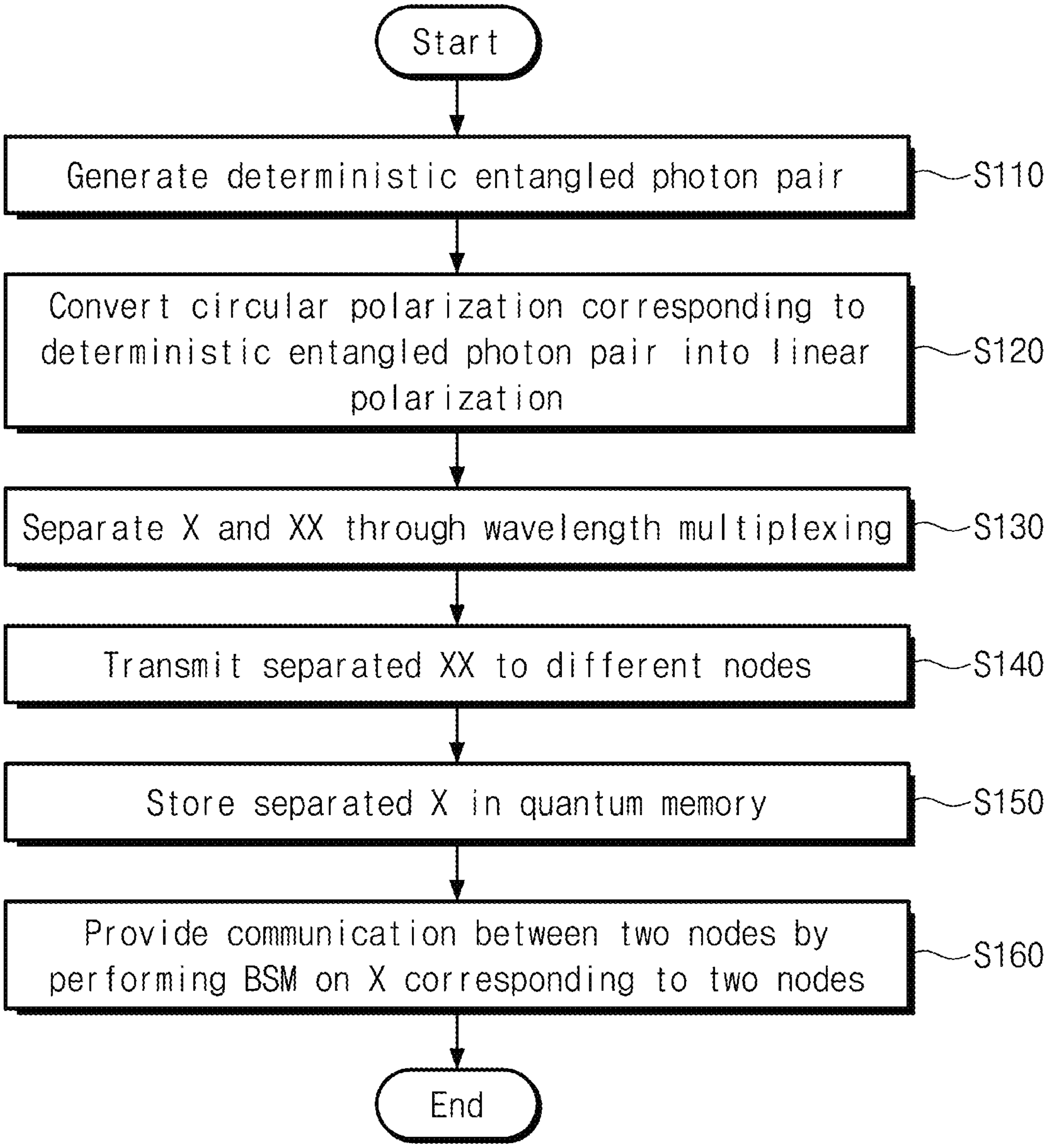
FIG. 7 is a flowchart showing an operation of the quantum router of FIG. 1.

FIG. 7 is a flowchart showing an operation of the quantum router of FIG. 1. Referring to FIG. 1 and FIG. 7, in operation S110, the quantum router 100 may generate a deterministic entangled photon pair. For example, the photon pair generation device 110 of the quantum router 100 may generate the deterministic entangled photon pair DEP. For example, the deterministic entangled photon pair DEP may be generated by using the semiconductor quantum dot QD, and may have a quantum entangled state in the polarization state.

In operation S120, the quantum router 100 may convert circular polarization corresponding to the deterministic entangled photon pair into linear polarization. For example, photons included in the deterministic entangled photon pair DEP may correspond to the exciton state X and the bi-exciton state XX, respectively. When the exciton state X corresponds to left circular polarization, the bi-exciton state XX may correspond to right circular polarization. When the exciton state X corresponds to right circular polarization, the bi-exciton state XX may correspond to left circular polarization. By using a N/4 wavelength plate, the polarization adjustment device 120 of the quantum router 100 may convert left circular polarization to vertical polarization and may convert right circular polarization to horizontal polarization.

In operation S130, the quantum router 100 may separate the X-photon X of the exciton state and the XX-photon XX of the bi-exciton state from each other through different paths by using wavelength multiplexing. For example, the multiplexing device 130 of the quantum router 100 may include the wavelength division multiplexer WDM. Because the X-photon X of the exciton state of the deterministic entangled photon pair DEP and the XX-photon of the bi-exciton state have different energy states, they may be separated from each other through different paths by the wavelength division multiplexer WDM. In an embodiment, even when being separated from each other through different paths by the wavelength division multiplexer WDM, the X-photon X of the exciton state and the XX-photon XX of the bi-exciton state in the deterministic entangled photon pair DEP may maintain a quantum entangled state.

In operation S140, the quantum router 100 may transmit separated XX-photons to different nodes. For example, the multiplexing device 130 of the quantum router 100 may include the first and second time-division multiplexers TDM1 and TDM2. The first time-division multiplexer TDM1 may sequentially output separated XX-photons to different paths. The second time-division multiplexer TDM2 may sequentially output separated X-photons to different paths. In an embodiment, the output of the first time-division multiplexer TDM1 and the output of the second time-division multiplexer TDM2 may have a time difference, and the time difference may be compensated for through the time delay device TD. The output (i.e., XX-photons) of the first time-division multiplexer TDM1 may be transmitted to different nodes N1 to N4 through different paths.

In operation S150, the quantum router 100 may store separated X-photons in a quantum memory. For example, the control device 140 of the quantum router 100 may include the quantum memory QM. The control device 140 may receive X-photons from the multiplexing device 130 and store the received X-photons in the quantum memory QM.

In operation S160, the quantum router 100 may provide a quantum communication channel between two nodes by performing the bell-state measurement BSM on X-photons corresponding to the two nodes. For example, the plurality of nodes N1 to N4 may receive XX-photons output from the multiplexing device 130, respectively. When providing a quantum communication channel for two nodes (e.g., N1 and N3) among the plurality of nodes N1 to N4, the control device 140 may perform the bell-state measurement BSM on the first X-photon X1 corresponding to the first node N1 and the third X-photon X3 corresponding to the third node N3. In this case, an entangled photon pair may be distributed to the first node N1 and the third node N3. In other words, a quantum entangled photon pair between the first XX-photon XX1 corresponding to the first node N1 and the third XX-photon XX3 corresponding to the third node N3 may be formed. Accordingly, the quantum communication channel between the first node N1 and the third node N3 is provided.

Figure 8:
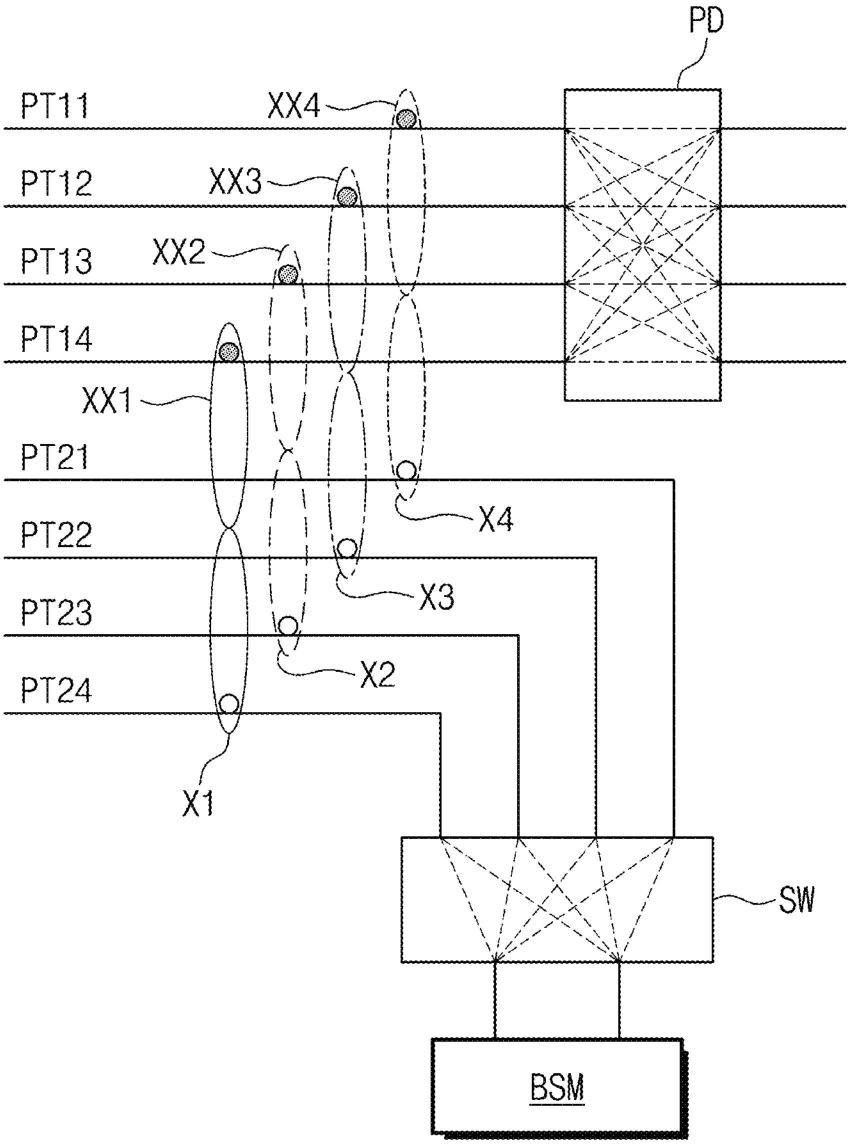
FIG. 8 is a drawing showing the control device of FIG. 1.

FIG. 8 is a drawing showing the control device of FIG. 1. In the preceding embodiment, the control device 140 may be configured to provide a quantum communication channel between two nodes among the plurality of nodes N1 to N4. However, the scope of the present disclosure is not limited thereto.

For example, the multiplexing device 130 may include phase devices PD. The phase devices PD may change paths of the first to fourth XX-photons XX1 to XX4 by performing phase control on the first to fourth XX-photons XX1 to XX4 provided through the eleventh to fourteenth paths PT11 to PT14. In this case, a logical function between arbitrary nodes may be implemented.

In an embodiment, the control device 140 may store the X-photons X received from the multiplexing device 130 in the quantum memory QM. However, the scope of the present disclosure is not limited thereto. For example, as shown in FIG. 8, the 21st to 24th paths PT21 to PT24 output from the multiplexing device 130 may be connected to a switch array SW. The switch array SW may be configured to select two paths (or paths corresponding to two nodes) from the 21st to 24th paths PT21 to PT24. Paths selected by the switch array SW may be connected to the bell-state measurement device BSM. In this case, the bell-state measurement device BSM may perform bell-state measurement on X-photons received through the selected paths, and thus a quantum communication channel between nodes corresponding to the selected paths may be provided.

As described above, according to embodiments of the present disclosure, the quantum router 100 may provide various methods and devices for providing a quantum communication channel between arbitrary nodes. For example, according to an embodiment of the present disclosure, the quantum router 100 may separate an entangled photon pair having different wavelengths, which is generated from the photon pair generation device 110 (or quantum light source) configured to generate a deterministic entangled photon pair, from each other through two channels and may multiplex photons for each channel.

According to an embodiment, the photon pair generation device 110 may be placed within a cryogenic system, and the multiplexing device 130 configured to perform multiplexing may be implemented as a photonic chip. The polarization adjustment device 120 may be configured to convert circular polarization into orthogonal linear polarization. The polarization adjustment device 120 may be placed between the cryogenic system and the photonic chip. The input and output of the polarization adjustment device 120 may be implemented with an optic fiber.

In an embodiment, the multiplexing device 130 may include the wavelength division multiplexer WDM configured to separate an entangled photon pair of different wavelengths from each other. The wavelength division multiplexer WDM may be integrated into a photonic chip. Alternatively, the wavelength division multiplexer WDM may be implemented as a device, which is formed separately from the photonic chip and is connected to an optic fiber.

In an embodiment, after performing double multiplexing on an X-photon and an XX-photon, the control device 140 may generate an entangled photon pair on two XX-photons among XX-photons having indistinguishable properties, by performing bell-state measurement on two X-photons among the X-photons having indistinguishable properties. In this case, a quantum communication channel may be provided between nodes corresponding to two XX-photons.

In an embodiment, to use the entangled state that is present in vertical/horizontal polarization of an X-photon and an XX-photon, the multiplexing device 130 may be implemented through a photonic integrated circuit chip that is not polarization-dependent The polarization-independent photonic integrated circuit may be implemented by using a thermo-optic switch.

Figure 9:
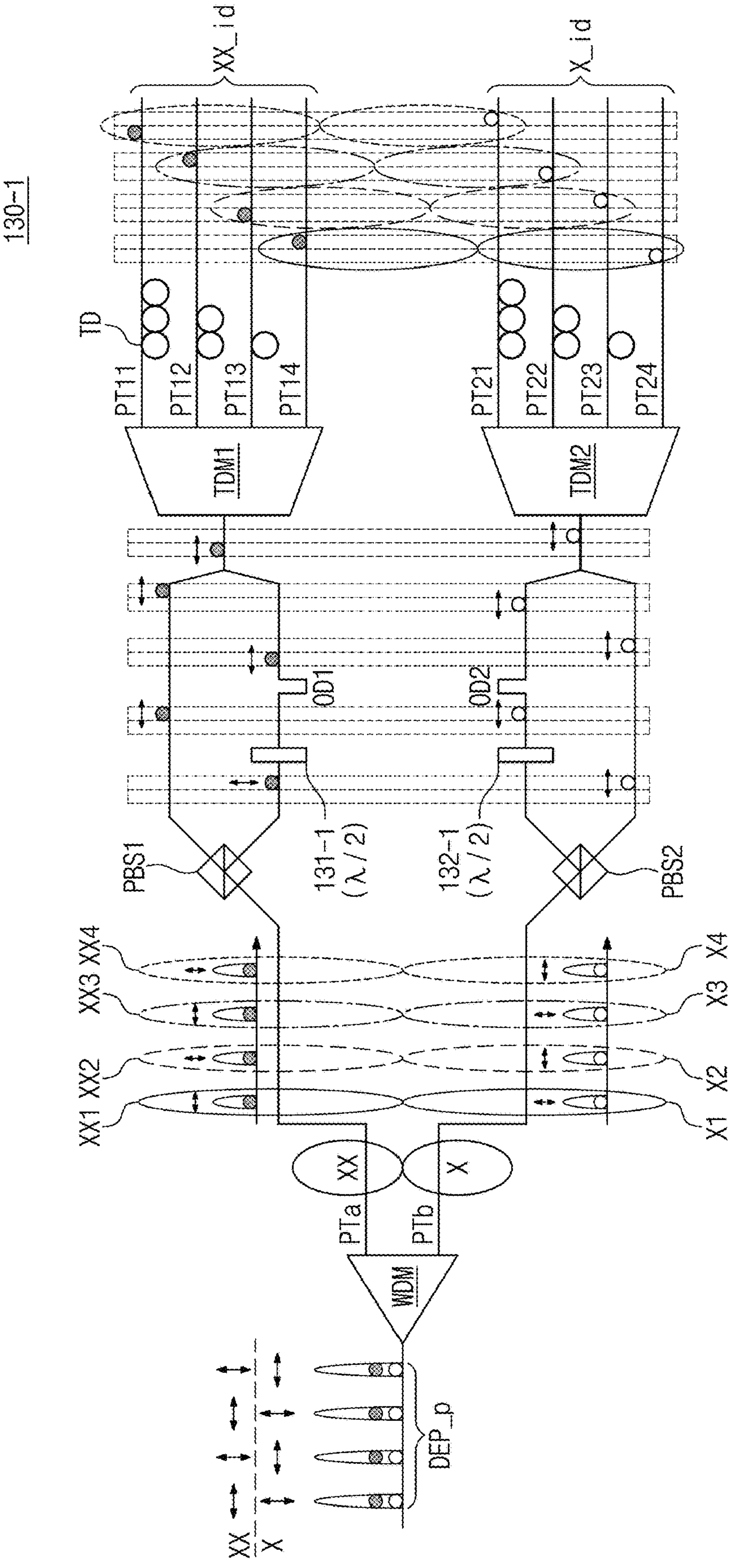
FIG. 9 is a drawing showing a multiplexing device, according to an embodiment of the present disclosure.

FIG. 9 is a drawing showing a multiplexing device, according to an embodiment of the present disclosure. In an embodiment, a multiplexing device 130-1 of FIG. 9 may correspond to the multiplexing device 130 of FIG. 1.

Referring to FIGS. 1 to 4 and 9, the multiplexing device 130-1 may receive the polarization-converted photon pair DEP_p. The multiplexing device 130 may perform a multiplexing operation on the polarization-converted photon pair DEP_p. In an embodiment, the multiplexing operation performed by the multiplexing device 130-1 of FIG. 9 may include operations such as wavelength division multiplexing, polarization state separation and unification, time-bin encoding-based qubit generation, and time-division multiplexing. The multiplexing device 130-1 may include the wavelength division multiplexer WDM. The wavelength division multiplexer WDM may be configured to separate an X-photon and an XX-photon from the polarization-converted photon pair DEP_p. The operation of the wavelength division multiplexer WDM is described with reference to FIG. 5, and thus a detailed description thereof is omitted. The XX-photon separated by the wavelength division multiplexer WDM may be provided to the a-th path PTa, and the X-photon may be provided to the b-th path PTb. In this case, as described with reference to FIG. 5, the XX-photons XX1 to XX4 of the a-th path PTa may maintain an entangled state with the X-photons X1 to X4 of the b-th path PTb, respectively.

The multiplexing device 130-1 may include a first polarization beam splitter PBS1, a second polarization beam splitter PBS2, a first polarization adjustment device 131-1, a second polarization adjustment device 132-1, a first optical delay device OD1, and a second optical delay device OD2.

The first polarization beam splitter PBS1, the first polarization adjustment device 131-1, and the first optical delay device OD1 may be configured to process the XX-photons XX1 to XX4 split from each other through the a-th path PTa. For example, the first polarization beam splitter PBS1 may receive the XX-photons XX1 to XX4 split through the a-th path PTa. The first polarization beam splitter PBS1 may split XX-photons (e.g., XX1 and XX3) having a horizontal polarization state among the XX-photons XX1 to XX4 through the first path and may split XX-photons (e.g., XX2 and XX4) having a vertical polarization state through the second path.

The first polarization adjustment device 131-1 may be located on the second path and may convert a vertical polarization state of the XX-photon into a horizontal polarization state. For example, the first polarization adjustment device 131-1 may include a N/2 wavelength plate configured to convert vertical polarization to horizontal polarization. The vertical polarization state of an XX-photon may be converted into a horizontal polarization state through the X2 wavelength plate.

The first optical delay device OD1 may be located on the second path and may delay the time of XX-photons on the second path. For example, XX-photons after passing through the first optical delay device OD1 may be delayed by a predetermined time compared to XX-photons before passing through the first optical delay device OD1.

The second polarization beam splitter PBS2, the second polarization adjustment device 132-1, and the second optical delay device OD2 may be configured to process the X-photons X1 to X4 split through the b-th path PTb. For example, the second polarization beam splitter PBS2 may receive the X-photons X1 to X4 split through the b-th path PTb. The second polarization beam splitter PBS2 may split X-photons (e.g., X1 and X3) having a horizontal polarization state among the X-photons X1 to X4 through the third path and may split X-photons (e.g., X2 and X4) having a vertical polarization state through the fourth path.

The second polarization adjustment device 132-1 may be located on the third path and may convert a vertical polarization state of the X-photon into a horizontal polarization state. For example, the second polarization adjustment device 132-1 may include a $\lambda/2$ wavelength plate configured to convert vertical polarization to horizontal polarization.

The vertical polarization state of an X-photon may be converted into a horizontal polarization state through the λ/2 wavelength plate.

The second optical delay device OD2 may be located on the third path and may delay the time of X-photons on the third path. For example, X-photons after passing through the second optical delay device OD2 may be delayed by a predetermined time compared to X-photons before passing through the second optical delay device OD2.

In an embodiment, through the first polarization beam splitter PBS1, the second polarization beam splitter PBS2, the first polarization adjustment device 131-1, the second polarization adjustment device 132-1, the first optical delay device OD1, and the second optical delay device OD2, XX-photons and X-photons may be unified into photons of a horizontal polarization state and may be composed of a qubit based on time-bin encoding.

For example, the first XX-photon XX1 and the first X-photon X1 may be a deterministic entangled photon pair. In this case, by the wavelength division multiplexer WDM, the first XX-photon XX1 is separated through the a-th path PTa, and the first X-photon X1 is separated through the b-th path PTb.

The first XX-photon XX1 has a horizontal polarization state, and the first X-photon X1 has a vertical polarization state. In this case, the first XX-photon XX1 is split through the first path by the first polarization beam splitter PBS1, and the first X-photon X1 is split through the third path by the second polarization beam splitter PBS2. In this case, the first XX-photon XX1 and the first X-photon X1, which are respectively separated from each other through first and third paths by the first and second polarization beam splitters PBS1 and PBS2, may be positioned at the same time.

The vertical polarization state of the first X-photon X1 may be converted to a horizontal polarization state by the second polarization adjustment device 132-1 on the third path, and may be delayed by a predetermined time by the second optical delay device OD2 on the third path. In this case, both the first XX-photon XX1 and the first X-photon X1 may be unified into photons of a horizontal polarization state. Moreover, the first XX-photon XX1 and the first X-photon X1 may have a predetermined time difference. The first XX-photon XX1 and the first X-photon X1 may maintain an entangled state. The first XX-photon XX1 and the first X-photon X1 may be composed of a qubit based on time-bin encoding.

As in the above description, the second XX-photon XX2 and the second X-photon X2 may be a deterministic entangled photon pair. In this case, by the wavelength division multiplexer WDM, the second XX-photon XX2 is separated through the a-th path PTa, and the second X-photon X2 is separated through the b-th path PTb.

The second XX-photon XX2 has a vertical polarization state, and the second X-photon X2 has a horizontal polarization state. In this case, the second XX-photon XX2 is split through the second path by the first polarization beam splitter PBS1, and the second X-photon X2 is split through the fourth path by the second polarization beam splitter PBS2. In this case, the second XX-photon XX2 and the second X-photon X2, which are respectively separated from each other through second and fourth paths by the first and second polarization beam splitters PBS1 and PBS2, may be positioned at the same time.

The vertical polarization state of the second XX-photon XX2 may be converted to a horizontal polarization state by the first polarization adjustment device 131-1 on the second path, and may be delayed by a predetermined time by the first optical delay device OD1 on the second path. In this case, both the second XX-photon XX2 and the second X-photon X2 may be unified into photons of a horizontal polarization state. Moreover, the second XX-photon XX2 and the second X-photon X2 may have a predetermined time difference. The second XX-photon XX2 and the second X-photon X2 may maintain an entangled state. The second XX-photon XX2 and the second X-photon X2 may be composed of a qubit based on time-bin encoding.

XX-photons and X-photons composed of qubits based on time-bin encoding are provided to the first time-division multiplexer TDM1 and the second time-division multiplexer TDM2, respectively. The first time-division multiplexer TDM1 may sequentially distribute XX-photons to the different paths PT11 to PT14 in a time-division method. The second time-division multiplexer TDM2 may sequentially distribute X-photons to the different paths PT21 to PT24 in the time-division method.

In an embodiment, as in the above description, XX-photons distributed from the first time-division multiplexer TDM1 may be the indistinguishable bi-exciton state XX_id, and X-photons distributed from the second time-division multiplexer TDM2 may be the indistinguishable exciton state X_id.

In an embodiment, the paths PT11 to PT14 output from the first time-division multiplexer TDM1 and the paths PT21 to PT24 output from the second time-division multiplexer TDM2 may include the time delay device TD. The time delay device TD may control the delay of a signal output to each path. For example, the XX-photons XX1 to XX4 sequentially output from the first time-division multiplexer TDM1 and the X-photons X1 to X4 sequentially output from the second time-division multiplexer TDM2 may have a time difference from each other. To maintain the quantum entanglement relationship between the XX-photons XX1 to XX4 and the X-photons X1 to X4, it is necessary to compensate for the time difference between the XX-photons XX1 to XX4 and the X-photons X1 to X4. The time delay device TD may compensate for the time difference of each path and then may distribute the corresponding XX-photons XX1 to XX4 and the X-photons X1 to X4 in parallel depending on a specific time or a predetermined cycle. In this case, the corresponding photons may maintain a quantum entangled state with each other.

For example, by the time delay device TD, the first XX-photon XX1 of the eleventh path PT11 and the first X-photon X1 of the 21st path PT21 may be distributed in parallel at the same time zone; the second XX-photon XX2 of the twelfth path PT12 and the second X-photon X2 of the 22nd path PT22 may be distributed in parallel at the same time zone; the third XX-photon XX3 of the thirteenth path PT13 and the third X-photon X3 of the 23rd path PT23 may be distributed in parallel at the same time zone; and, the fourth XX-photon XX4 of the fourteenth path PT14 and the fourth X-photon X4 of the 24th path PT24 may be distributed in parallel at the same time zone. Accordingly, the XX-photons XX1 to XX4 and the X-photons X1 to X4 may maintain quantum entangled states with each other.

In an embodiment, because XX-photons and X-photons constitute time-bin qubits, XX-photons and X-photons distributed in parallel in the same time zone may have a predetermined time difference. For example, XX-photon on the eleventh path PT11 and X-photon on the 21st path PT21 may have a predetermined time difference, but may located in parallel in the same time zone. In this case, the XX-photon on the eleventh path PT11 and the X-photon on the 21st path PT21 may be composed of qubits based on time-bin encoding, and they may maintain an entangled state with each other.

Likewise, XX-photons and X-photons on other paths PT12 to PT14 and PT22 to PT24 may have a predetermined time difference, but may be located in parallel in the same time zone. In this case, XX-photons and X-photons on the other paths PT12 to PT14 and PT22 to PT24 may be composed of qubits based on time-bin encoding, and they may maintain an entangled state with each other.

For brevity of drawing, a structure in which one XX-photon or one X-photon is transmitted through each path is shown, but the scope of the present disclosure is not limited thereto. For example, XX-photons and X-photons may be continuously transmitted through the plurality of paths PT11 to PT14 and PT21 to PT24. This is described with reference to FIG. 5, and thus a detailed description thereof is omitted.

Figure 10:
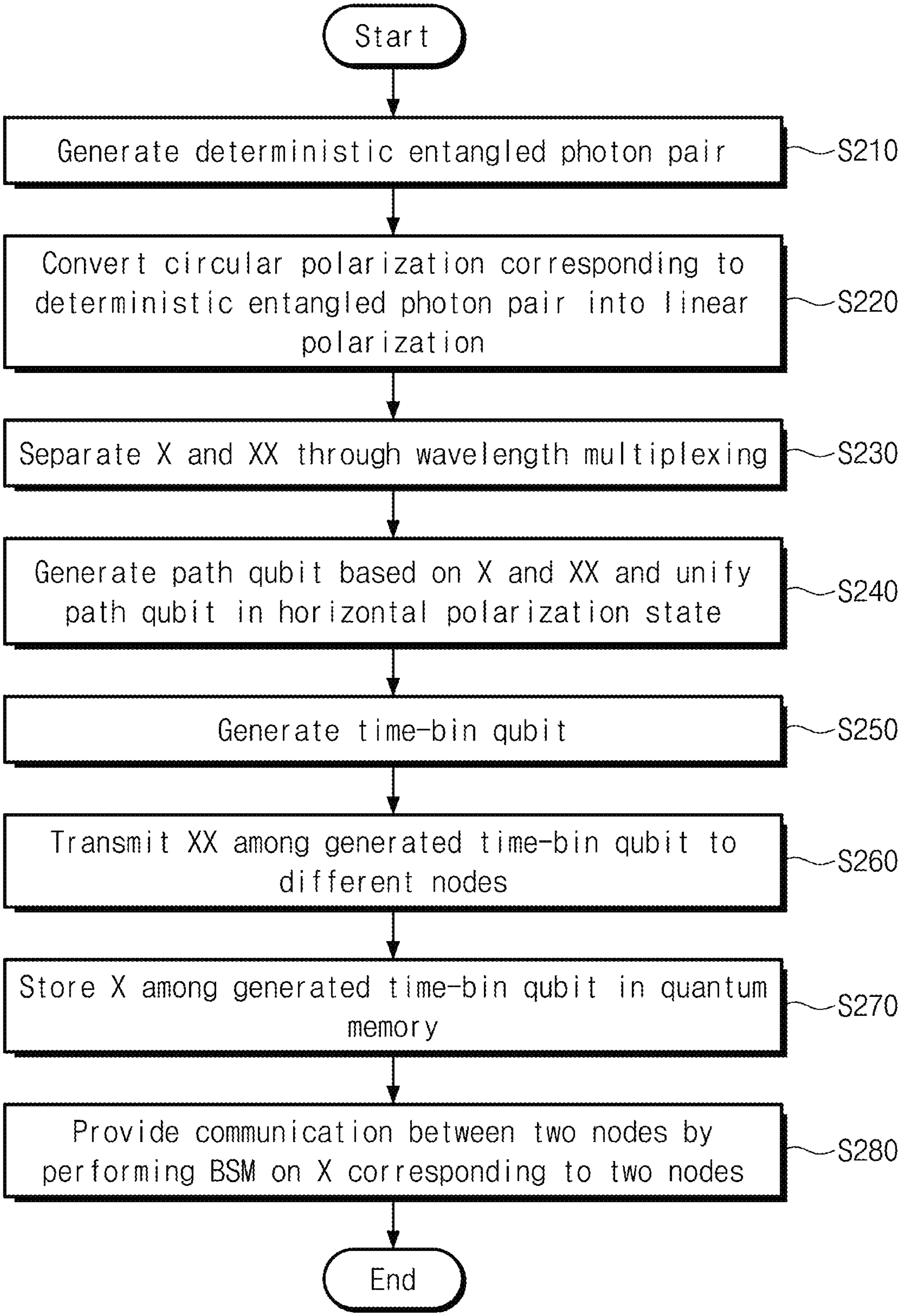
FIG. 10 is a flowchart showing an operation of the quantum router of FIG. 1.

FIG. 10 is a flowchart showing an operation of the quantum router of FIG. 1. In an embodiment, the multiplexing device 130 of the quantum router 100 may be the multiplexing device 130-1 described with reference to FIG. 9. Referring to FIGS. 1, 9, and 10, the quantum router 100 may perform operations S210 to S230. Operations S210 to S230 are similar to operations S110 to S130 of FIG. 7, and thus, a detailed description thereof will not be repeated here.

In operation S240, the quantum router 100 may generate a path qubit based on an X-photon and an XX-photon, and may unify the path qubit in a horizontal polarization state. For example, as described with reference to FIG. 9, the first and second polarization beam splitters PBS1 and PBS2 of the multiplexing device 130-1 of the quantum router 100 may distribute XX-photons and X-photons to different paths based on polarization states (e.g., vertical polarization and horizontal polarization) of XX-photons and X-photons. The first and second polarization adjustment devices 131-1 and 132-1 of the multiplexing device 130-1 of the quantum router 100 may convert polarization states of XX-photons and X-photons having a vertical polarization state into a horizontal polarization state. Accordingly, the polarization states of both XX-photons and X-photons may be unified into horizontal polarization states.

In operation S250, the quantum router 100 may generate a qubit based on time-bin encoding. For example, as described with reference to FIG. 9, the first and second optical delay devices OD1 and OD2 of the multiplexing device 130-1 of the quantum router 100 may delay polarization states of XX-photons and X-photons converted from vertical polarization states to horizontal polarization states by a predetermined time. In this case, XX-photon and X-photon, which constitute a photon pair, may have a time difference by a predetermined time. In other words, qubits based on time-bin encoding may be generated by the delay operations of the first and second optical delay devices OD1 and OD2.

Next, the quantum router 100 may perform operations S260 to S280. Except that qubits based on time-bin encoding are used, operations S260 to S280 are similar to operations S140 to S160 of FIG. 7, and thus, additional description will be omitted.

The above description refers to detailed embodiments for implementing the present disclosure. The present disclosure may include embodiments in which a design is changed simply or which are easily changed, as well as the embodiments described above. In addition, technologies that are easily changed and implemented by using the above embodiments may be included in the present disclosure. Accordingly, it will be apparent to those of ordinary skill in the art that various changes and modifications may be made to the above embodiments without departing from the spirit and scope of the present disclosure as set forth in the following claims.

According to an embodiment of the present disclosure, a quantum router having improved performance and improved reliability and an operating method thereof are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A quantum router comprising:

a photon pair generation device configured to generate a deterministic entangled photon pair;

a polarization adjustment device configured to convert and output a polarization state of the deterministic entangled photon pair;

a multiplexing device configured to output first indistinguishable photons through first paths and to output second indistinguishable photons through second paths, by performing double multiplexing on the output of the polarization adjustment device; and a control device configured to receive the second indistinguishable photons through the second paths, wherein the first indistinguishable photons are transmitted to a plurality of nodes through the first paths, and wherein the control device is further configured to:

provide a quantum communication channel for two nodes among the plurality of nodes by performing bell-state measurement on two of the second indistinguishable photons.

2. The quantum router of claim 1, wherein the photon pair generation device includes:

a signal generator configured to output a periodic optical signal; and a semiconductor quantum dot configured to generate the deterministic entangled photon pair in response to the periodic optical signal.

3. The quantum router of claim 1, wherein the polarization adjustment device includes a λ wavelength plate configured to convert left circular polarization of the deterministic entangled photon pair to vertical polarization and to convert right circular polarization of the deterministic entangled photon pair to horizontal polarization.

4. The quantum router of claim 3, wherein an input and an output of the polarization adjustment device are connected through an optic fiber.

5. The quantum router of claim 1, wherein the multiplexing device includes:

a wavelength division multiplexer configured to split a photon of an exciton state and a photon of a bi-exciton state from the output of the polarization adjustment device;

a first time-division multiplexer configured to sequentially output photons of the bi-exciton state as the first indistinguishable photons through the first paths; and a second time-division multiplexer configured to sequentially output photons of the exciton state as the second indistinguishable photons through the second paths.

6. The quantum router of claim 5, wherein the multiplexing device is formed based on a photonic chip that is not polarization dependent.

7. The quantum router of claim 6, wherein the wavelength division multiplexer is placed outside the photonic chip and connected to the photonic chip through an optic fiber.

8. The quantum router of claim 6, wherein the first time-division multiplexer and the second time-division multiplexer are implemented based on a thermo-optic switch.

9. The quantum router of claim 5, wherein the multiplexing device includes:

a plurality of time delay devices connected to the first paths and the second paths, wherein the plurality of time delay devices are configured to:

respectively delay signals of the first paths and the second paths such that the first indistinguishable photons and the second indistinguishable photons are placed in parallel depending on a predetermined period.

10. The quantum router of claim 1, wherein the multiplexing device includes:

a wavelength division multiplexer configured to split a photon of an exciton state and a photon of a bi-exciton state from the output of the polarization adjustment device;

a first polarization beam splitter configured to distribute the photon of the bi-exciton state based on a polarization state of the photon of the bi-exciton state;

a second polarization beam splitter configured to distribute the photon of the exciton state based on a polarization state of the photon of the exciton state;

a first polarization adjustment device configured to convert a vertical polarization state of the photon of the bi-exciton state into a horizontal polarization state;

a second polarization adjustment device configured to convert a vertical polarization state of the photon of the exciton state into a horizontal polarization state;

a first optical delay device configured to delay an output of the first polarization adjustment device by a predetermined time;

a second optical delay device configured to delay an output of the second polarization adjustment device by a predetermined time;

a first time-division multiplexer configured to sequentially output an output of the first polarization beam splitter and an output of the first optical delay device as the first indistinguishable photons through the first paths; and a second time-division multiplexer configured to sequentially output an output of the second polarization beam splitter and an output of the second optical delay device as the second indistinguishable photons through the second paths.

11. The quantum router of claim 10, wherein the first indistinguishable photons and the second indistinguishable photons are qubits based on time-bin encoding.

12. The quantum router of claim 1, wherein the control device includes:

a quantum memory configured to store the second indistinguishable photons received through the second paths; and a bell-state measurement device configured to perform bell-state measurement on the two of the second indistinguishable photons stored in the quantum memory.

13. The quantum router of claim 1, wherein the control device includes:

a switch array connected to the second paths and configured to select two paths among the second paths; and a bell-state measurement device configured to receive the two of the second indistinguishable photons, which are stored in a quantum memory, through the two selected paths and to perform bell-state measurement on the two second indistinguishable photons.

14. An operating method of a quantum router, the method comprising:

generating a deterministic entangled photon pair;

converting circular polarization corresponding to the deterministic entangled photon pair into linear polarization;

separating photons of an exciton state and photons of a bi-exciton state by performing wavelength division multiplexing on the deterministic entangled photon pair;

transmitting the photons of the bi-exciton state to a plurality of nodes through first paths, respectively; and providing a quantum communication channel between two nodes among the plurality of nodes by performing bell-state measurement on two of the photons of the exciton state.

15. The method of claim 14, wherein the generating of the deterministic entangled photon pair includes:

generating a periodic optical signal; and generating the deterministic entangled photon pair through a semiconductor quantum dot in response to the periodic optical signal.

16. The method of claim 14, wherein the converting of the circular polarization corresponding to the deterministic entangled photon pair into the linear polarization includes:

converting left circular polarization corresponding to the deterministic entangled photon pair to vertical polarization, and converting right circular polarization to horizontal polarization.

17. The method of claim 14, wherein the separating of the photons of the exciton state and the photons of the bi-exciton state by performing the wavelength division multiplexing on the deterministic entangled photon pair includes:

adjusting a time delay for the first paths and second paths such that the photons of the exciton state output to the first paths and the photons of the bi-exciton state output to the second paths are arranged in parallel depending on a predetermined period.

* * * * *